(12) United States Patent
Chandramouli et al.

(10) Patent No.: US 11,093,218 B2
(45) Date of Patent: Aug. 17, 2021

(54) DYNAMIC PATTERN MATCHING CODE GENERATION

(71) Applicant: Microsoft Technology Licensing, LLC, Redmond, WA (US)

(72) Inventors: Badrish Chandramouli, Redmond, WA (US); Jonathan D. Goldstein, Woodinville, WA (US); Michael Barnett, Seattle, WA (US); James Felger Terwilliger, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 768 days.

(21) Appl. No.: 15/650,455

(22) Filed: Jul. 14, 2017

(65) Prior Publication Data

US 2019/0018905 A1    Jan. 17, 2019

(51) Int. Cl.
*G06F 8/30*     (2018.01)
*G06F 16/903*   (2019.01)
*G06F 9/455*    (2018.01)
*G06N 99/00*    (2019.01)

(52) U.S. Cl.
CPC .......... *G06F 8/315* (2013.01); *G06F 9/45516* (2013.01); *G06F 16/90344* (2019.01); *G06N 99/00* (2013.01)

(58) Field of Classification Search
None
See application file for complete search history.

(56) References Cited

U.S. PATENT DOCUMENTS

| 8,190,738 B2 | 5/2012 | Ruehle |
| 8,448,249 B1 | 5/2013 | Preston |
| 8,626,688 B2 | 1/2014 | Ichino |
| 8,762,297 B2 | 6/2014 | Chandramouli et al. |
| 9,021,582 B2 | 4/2015 | Goldman et al. |
| 9,305,238 B2 | 4/2016 | Srinivasan et al. |

(Continued)

OTHER PUBLICATIONS

Sakharov ("State Machine Specification Directly in Java and C++") (Year: 2000).*

(Continued)

*Primary Examiner* — Vincent Gonzales
(74) *Attorney, Agent, or Firm* — Workman Nydegger

(57) ABSTRACT

An intermediate representation of a workflow of one or more modules may be generated to decouple language implementations of the one or more modules. In response to receiving a workflow of one or more modules, the workflow may be analyzed to determine an optimal implementation language for each of the one or more modules to thereby reduce effects of data marshalling. An intermediate representation of the workflow that is configured to decouple any implementation languages associated with the one or more modules may be generated. To allow for decoupling, the intermediate representation may be written in a declarative language. The generated intermediate representation may then be compiled to generate an executable program that corresponds to the workflow and is implemented in the determined optimal language for each of the one or more modules.

20 Claims, 4 Drawing Sheets

(56) References Cited

U.S. PATENT DOCUMENTS

| | | | | |
|---|---|---|---|---|
| 2005/0050520 | A1* | 3/2005 | Motoyama | G06F 8/20 |
| | | | | 717/123 |
| 2007/0038798 | A1* | 2/2007 | Bouchard | G06F 12/06 |
| | | | | 711/3 |
| 2011/0137942 | A1 | 6/2011 | Yan et al. | |
| 2012/0221497 | A1* | 8/2012 | Goyal | H04L 69/12 |
| | | | | 706/12 |
| 2014/0214749 | A1* | 7/2014 | Ruehle | G06N 5/025 |
| | | | | 706/48 |

OTHER PUBLICATIONS

Chen et. al ("Register automata with linear arithmetic"). (Year: 2017).*

Leghari et al. ("Efficient Pattern Detection Over a Distributed Framework") (Year: 2015).*

Kolchinsky, et al., "Efficient Detection of Complex Event Patterns Using Lazy Chain Automata", In Journal of Computing Research Repository, Dec. 2016, pp. 1-43.

"Pattern Detection with StreamInsight", https://blogs.msdn.microsoft.com/streaminsight/2010/09/02/pattern-detection-with-streaminsight/, Published on: Sep. 2, 2010, 2 pages.

"Spark Streaming", http://spark.apache.org/streaming/, Retrieved on: Jan. 24, 2017, 2 pages.

Hugo, et al., "Visualization in Big Data: A tool for pattern recognition in data stream", In Salesian Journal on Information Systems, vol. 1, Issue 15, 2015, pp. 30-38.

Hagedorn, et al., "Stream processing platforms for analyzing big dynamic data", In Journal of Information Technology, vol. 58, Issue 4, Aug. 2016, 195-205 pages.

Chandramouli, et al., "High-Performance Dynamic Pattern Matching over Disordered Streams", In Journal of the 36th International Conference on Very Large Data Bases, vol. 3, Issue 1, Sep. 2010, pp. 220-231.

Agrawal, et al., "Efficient pattern matching over event streams", In Proceedings of the 2008 ACM SIGMOD international conference on Management of data, Jun. 9, 2008, pp. 147-160.

"Trill: A High-Performance Incremental Query Processor for Diverse Analytics", In Journal of the VLDB Endowment, vol. 8, Issue 4, Dec. 2014, pp. 401-412.

Majumder, et al., "Scalable regular expression matching on data streams", In Proceedings of the ACM SIGMOD international conference on Management of data, Jun. 9, 2008, pp. 161-172.

Mei, et al., "Zstream: a cost-based query processor for adaptively detecting composite events", In Proceedings of the ACM SIGMOD International Conference on Management of data, Jun. 29, 2009, pp. 193-206.

Woods, W. A., "Transition network grammars for natural language analysis", In Magazine of Communications of the ACM, vol. 13, Issue 10, Oct. 1970, pp. 591-606.

Wu, et al., "High-performance complex event processing over streams", In Proceedings of the ACM SIGMOD international conference on Management of data, Jun. 27, 2006, pp. 407-418.

Yu, et al., "Fast and memory-efficient regular expression matching for deep packet inspection", In Proceedings of the ACM/IEEE symposium on Architecture for networking and communications systems, Dec. 3, 2006, pp. 93-102.

* cited by examiner

DYNAMIC PATTERN MATCHING CODE GENERATION

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

As the number of connected (whether wired or wireless) computer devices continues to increase (e.g., laptops, desktops, tablets, smartphones, smart watches, Internet of Things (IoT) devices, and so forth), an already massive amount of generated and transmitted data also continues to increase. As such, the desire for individuals and companies to derive timely insights over such data is also growing rapidly. While relational-style streaming logic may be useful in many scenarios, such logic has difficulty in detecting more complex patterns. Additionally, while in-memory relational-style queries may achieve throughputs close to memory-bandwidth, real-time pattern detection can still be an expensive operation, topping out at less than a million events per second in today's systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to generating code that is specific to a particular augmented finite automaton (AFA) for efficient identification of patterns within a stream of data. For example, embodiments may include accessing a specification corresponding to an augmented finite automaton that is configured to identify one or more patterns within a stream of data. Embodiments may also include analyzing the specification corresponding to the augmented finite automaton. Embodiments may further include, based on the analysis of the specification corresponding to the augmented finite automaton, identifying one or more characteristics associated with the specification corresponding to the augmented finite automaton. Embodiments may further include, based on the identified one or more characteristics, dynamically generating code specific to the augmented finite automaton that is configured to identify the one or more patterns within the stream of data.

In this way, a specification associated with an augmented finite automaton for pattern detection over streams of data may be created utilizing a software programming language. Such specifications may include pattern detection that leverages latency-aware batching, grouped execution, columnar data organization, and customized dynamic code generation based on both stream and automata properties. Such dynamic code generation may allow for creating code that is specifically tailored to a particular augmented finite automaton and the type of stream that will be analyzed by the automaton. Additionally, a language-integrated application programming interface (API) to be used in conjunction with the specification may also be generated. Using such specifications, API's, and dynamically generated code may allow for matching patterns within streams of data at orders-of-magnitude higher throughputs than previously possible.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
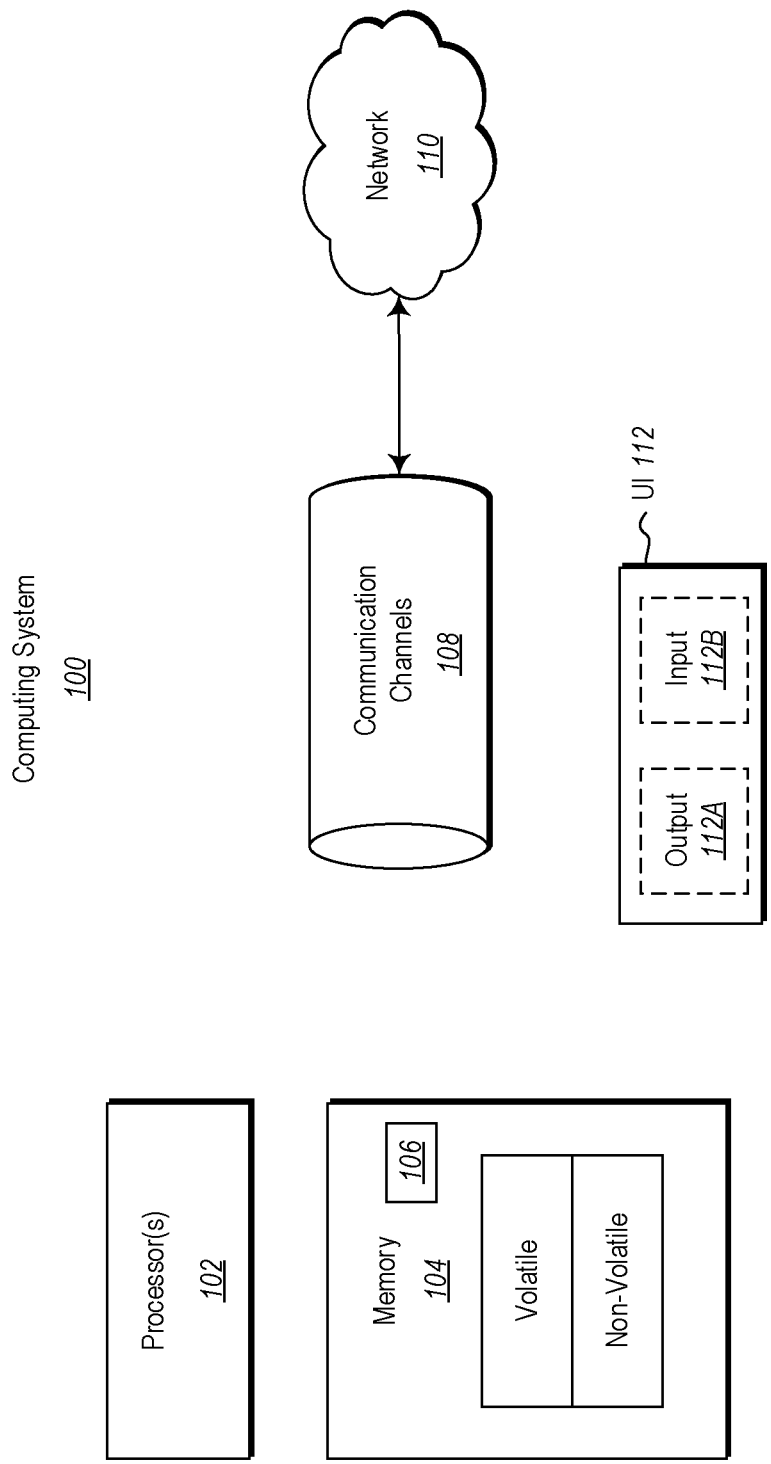
FIG. 1 illustrates an example computer architecture that facilitates operation of the principles described herein.

At least some embodiments described herein relate to generating code that is specific to a particular augmented finite automaton for efficient identification of patterns within a stream of data. For example, embodiments may include accessing a specification corresponding to an augmented finite automaton that is configured to identify one or more patterns within a stream of data. Embodiments may also include analyzing the specification corresponding to the augmented finite automaton. Embodiments may further include, based on the analysis of the specification corresponding to the augmented finite automaton, identifying one or more characteristics associated with the specification corresponding to the augmented finite automaton. Embodiments may further include, based on the identified one or more characteristics, dynamically generating code specific to the augmented finite automaton that is configured to identify the one or more patterns within the stream of data.

In this way, a specification associated with an augmented finite automaton for pattern detection over streams of data may be created utilizing a software programming language. Such specifications may include pattern detection that leverages latency-aware batching, grouped execution, columnar data organization, and customized dynamic code generation based on both stream and automata properties. Such dynamic code generation may allow for creating code that is specifically tailored to a particular augmented finite automaton and the type of stream that will be analyzed by the automaton. Additionally, a language-integrated application programming interface (API) to be used in conjunction with the specification may also be generated. Using such specifications, API's, and dynamically generated code may allow for matching patterns within streams of data at orders-of-magnitude higher throughputs than previously possible.

Some introductory discussion of a computing system will be described with respect to FIG. 1. Then generating code that is specific to a particular augmented finite automaton for efficient identification of patterns within a stream of data will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
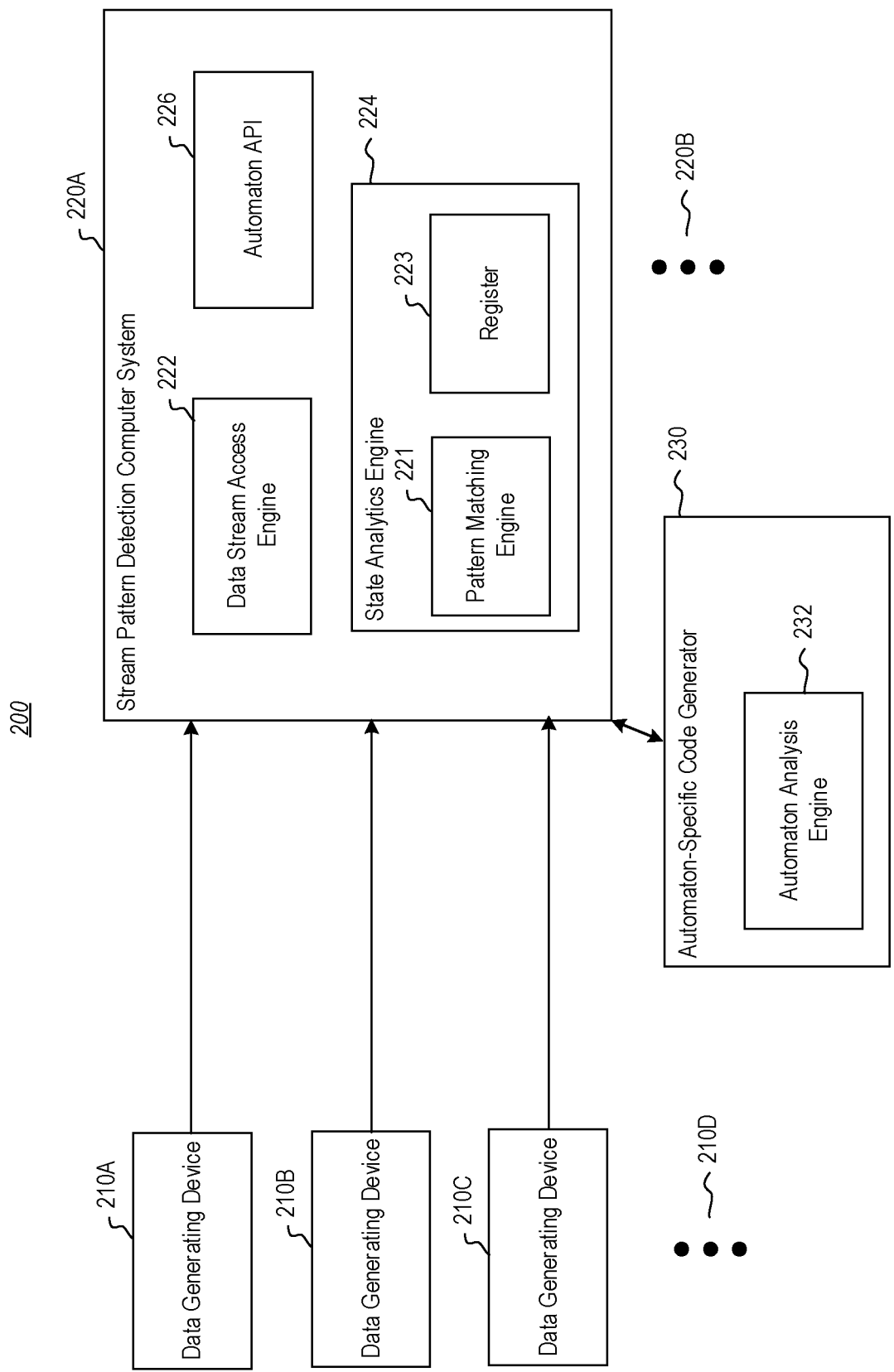
FIG. 2 illustrates an example environment for generating code that is specific to a particular augmented finite automaton for efficient identification of patterns within a stream of data.

FIG. 2 illustrates a computer environment 200 for accessing streams of potentially large amounts of data from potentially large numbers of data generating devices, generating code specific to a particular automaton, and using the generated code to efficiently identify patterns within the data stream. As shown, FIG. 2 includes data generating device 210A, data generating device 210B, data generating device 210C, stream pattern detection computer system 220A, and automaton-specific code generator 230, each of which may correspond to the computer system 100, as described with respect to FIG. 1. While only three data generating devices 210 (i.e., data generating device 210A, data generating device 210B, and data generating device 210C) and one stream pattern detection computer system are shown, ellipses 210D and ellipses 220B represent that any number of data generating devices and any number of stream pattern detection computer systems may be used to practice the principles described herein, respectively.

Each of the data generating devices 210 may comprise a computer system that generates data. For instance, the data generating device 210A may comprise a sensor that generates readings associated with the sensor. In a more particular example, the sensor may comprise an Internet of Things (IoT) device (e.g., a smart thermostat, a smart sprinkler system, a smart doorbell, a smart refrigerator, and so forth). In another example, such a data generating device may comprise a laptop computer, desktop computer, smartphone, tablet, smartwatch, and so forth. Notably, while specific examples of data generating devices are described herein, virtually any computer system/device that is capable of generating data may be used as a data generating device 210 to practice the principles described herein.

As briefly described, FIG. 2 also includes the stream pattern detection computer system 220A. The stream pattern detection computer system 220A may comprise a computer system that is capable of accessing streams of potentially large amounts of data from potentially large numbers of data generating devices and identifying patterns within the accessed streams, as further described herein. As illustrated, the stream pattern detection computer system computer system includes a data stream access engine 222, a state analytics engine 224, and an AFA application programming interface (API) 226. The various engines and/or functional blocks of the stream pattern detection computer system 220A may be implemented on a local computer system or may be implemented on a distributed computer system that includes elements resident in the cloud or that implement aspects of cloud computing.

The various engines and/or functional blocks of the stream pattern detection computer system 220A may be implemented as software, hardware, or a combination of software and hardware. Notably, the stream pattern detection computer system 220 may include more or less than the engines/functional blocks illustrated in FIG. 2. Additionally, some of the engines/functional blocks of the stream pattern detection computer system 220A may be combined as circumstances warrant. Although not illustrated, the various engine/functional blocks of the stream pattern detection computer system 220A may access and/or utilize a processor and memory, such as processor 102 and memory 104, as needed to perform their various functions.

As briefly described, the stream pattern detection computer system 220A may comprise a computer system that is capable of accessing streams of potentially large amounts of data from potentially large numbers of data generating devices and identifying patterns within the accessed stream. As illustrated, the stream pattern detection computer system 220A includes data stream access engine 222. The data stream access engine may be capable of receiving and/or retrieving data streams from one or more data generating devices 210. A stream may comprise a sequence of events, wherein each event comprises data (e.g., a notification, a measurement, and so forth) received from a data generating device 210 (e.g., a sensor). For instance, a stream may comprise readings generated by, and received from, a plurality of Internet of Things (IoT) devices that each comprise one or more sensors (e.g., smart thermostat, smart sprinkler system, and so forth). In another example, a stream may be associated with a stock tracker that includes a symbol of the stock, a current price, recent increase/decrease in price, and so forth. While a few examples are described herein, such descriptions are used for exemplary purposes only. As such, a stream may comprise essentially any type of data that can be transmitted or accessed by a computer system.

Notably, in some embodiments, the stream pattern detection computer system 220A may comprise (or utilize) an augmented finite automaton (AFA) computer system. Such an AFA may comprise a directed graph having a plurality of nodes that each represent a state. Edges between each node/state may be referred to as an arc that defines when a transition occurs. As such, the stream pattern detection computer system 220A (e.g., an AFA) may include a state analysis engine 224. The state analytics engine may be configured to determine when (and when not) to transition from one state to another state. As part of determining when (or when not) to transition to a different state, the state analytics engine 224 may include pattern matching engine 221. The pattern matching engine may be configured to analyze data streams that have been accessed by the data stream access engine. More specifically, the pattern matching engine may be capable of identifying events, and more specifically, patterns of events within each accessed data stream, as further described herein. For instance, the pattern matching engine may identify an 'A' followed by a 'B' followed by a 'C' event. The state analytics engine 224 may include an additional computation state in the form of register 223. The register 223 may comprise a counter associated with identified events, as further described herein. Such use of a register (e.g., the register 223) may allow for identifying/detecting complex patterns. For instance, numerous events of a first type followed by numerous events of a second type may be identified, as shown in FIG. 3.

Figure 3:
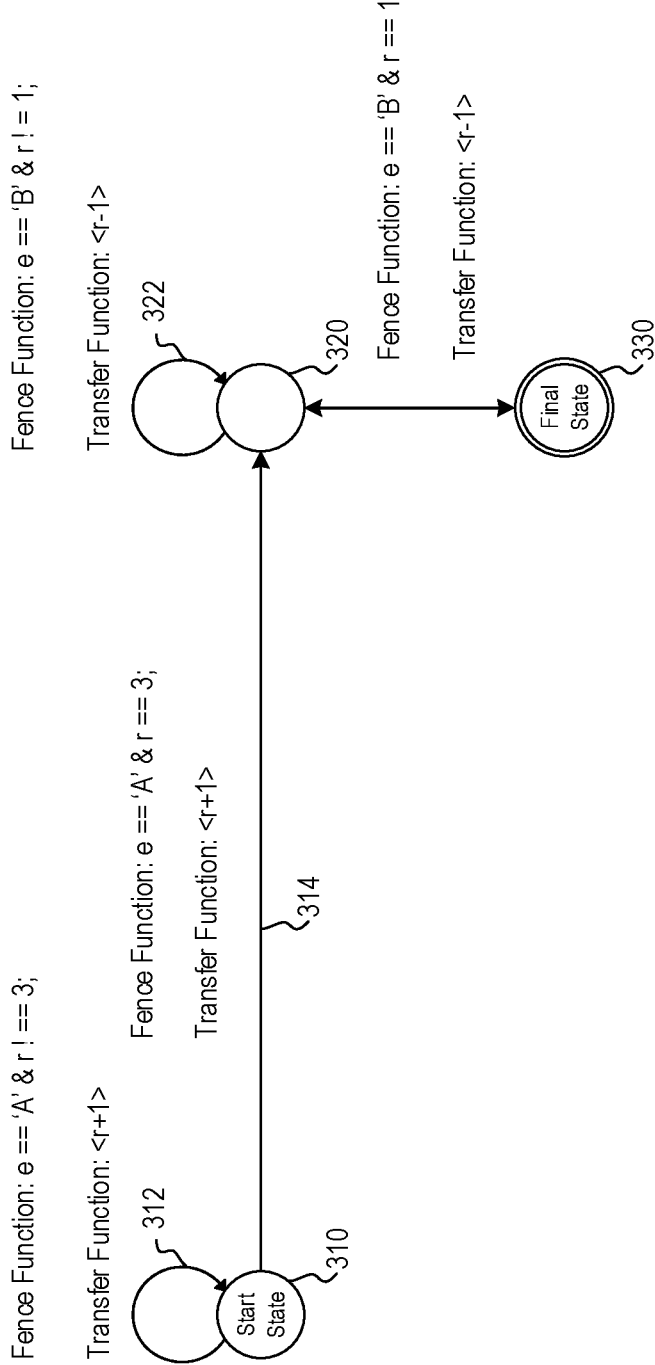
FIG. 3 illustrates an example of an augmented finite automaton that includes multiple states and multiple arcs.

FIG. 3 illustrates an example AFA 300 having three states, start state 310, second state 320, and final state 330. As illustrated, each given arc (i.e., arc 312, arc 314, arc 322, and arc 324) includes a fence function that is used to determine whether a transition associated with the given arc is triggered, as well as a transfer function associated with maintaining an appropriate count within a register corresponding to the AFA, as further described herein. As such, the state analytics engine may utilize the fence function and the transfer function for each given arc to determine when to transition to another state within an AFA. As illustrated, the AFA 300 (and more specifically, the pattern matching engine 221) is configured to identify a pattern of four 'A's followed by four 'B's, wherein each 'A' or 'B' comprises an event. As shown, the arc 312 includes a fence function that will remain in the start state (i.e., the start state will remain the current state) while both an A is identified in an accessed stream and a register value (e.g., of the register 223), r, is not equal to three.

Additionally, as shown, the transfer function comprises incrementing the register value r by one each time an 'A' is identified (notably, the count r starts at zero). Once the register value r hits three (i.e., three previous A's have been identified), the state analytics engine may determine that the current state is to become the second state 320, as the arc 314 includes a fence function comprising an identification of an event 'A' and a determination that the register value is equal to 3. Upon reaching the second state, the arc 322 includes a fence function that comprises remaining in the second state as long as 'B' events are identified and the register value r is not equal to one (notably, upon arriving at the second state 320, the register value r is four in this example). The arc 322 further includes a transfer function that decrements the register value r by one each time a 'B' is identified.

Accordingly, after identifying three 'B's, the register value r will be decremented, resulting in a value of 1. As such, based on the fence functions of both arc 322 and 324, upon receiving a fourth 'B', a transition will take place to the final state 330 (i.e., the fence function of the arc 322 will no longer be true, as the register value r will be equal to one, and therefore, the arc fence function 324 will be true). Additionally, upon identifying the fourth 'B', the register value r will be decremented by one and the particular instance of pattern matching by the AFA 300 is complete (as a transition to the final state 330 occurs). Notably, while a particular pattern matching example is described herein (i.e., four A's, followed by four B's), the particular example was used for exemplary purposes only. As such, the AFA described herein may be used with essentially limitless pattern matching examples.

Notably, an instance of such an AFA, as described with respect to the stream pattern detection computer system 220A of FIG. 2 and the AFA 300 of FIG. 3, may be specified using any number of computer programming languages (e.g., C#, JAVA®, C++, and so forth). Accordingly, features of such an AFA instance implemented in a computer programming language will now be described herein. As such, while the description herein primarily utilizes C#, essentially any appropriate programming language may be used.

An instance of an empty AFA may be created using the AFA's constructor. Notably, an AFA instance may be associated with three generic types, TInput, TRegister, and TAccumulator. TInput refers to the type of the payload in the input stream. For example, for a stream of character values, TInput would be of type "char" (i.e., an character type). Notably, however, TInput may comprise any particular type (e.g., "char," "int," and so forth). TRegister refers to the type of the register associated with any active runtime state of the AFA. For instance, if an event pattern to be identified comprises a sequence of 'A's followed by a sequence of the same number of 'B's, written as $A^iB^i$, a count of 'A's may be tracked using a register of type int. TAccumulator refers to a type of the accumulator. An accumulator is used to accumulate changes to the register when processing multiple events that occur simultaneously (i.e., events having the same timestamp), as further described herein. In an example, in order to detect $A^iB^i$, over a stream of 'char' values (i.e., character values), the following AFA instance may be created: "var pati=new Afa<char, int, Empty>( )". Here, "int" refers to the register that maintains the count of 'A's seen, whereas the accumulator is an empty type (i.e., "Empty") to indicate that an accumulator is not used with respect to this particular AFA instance.

As described herein, an AFA (e.g, the AFA 300) comprises a plurality of states, as well as arcs between each state. Each arc in an AFA represents a connection between two AFA states, and describes how a running instance of the AFA can transition from one current state to another (note that multiple active current states may be present, when the AFA is non-deterministic, as further described herein). Each state of the AFA may be associated with an integer starting from zero. A user may add states to the AFA implicitly when defining each arc of the AFA. Numerous arc types may be used with respect to the principles described herein, including a single element arc and a list element arc.

Single element arcs represent the consumption of a single event at a unique timestamp. A single element arc utilizes a fence function that describes the condition under which an incoming event would cause a transition from one state to another (based on a new event timestamp, a new event payload, and a current value of the register), and a transfer function that describes the new value of the register at the destination state of the AFA. A single element arc may be added to an AFA instance as follows: "afa.AddSingleElementArc(from, to, . . . )". In an example (i.e., the example of FIG. 3), arcs a1, a2, and a3 may be written as follows:
afa.AddSingleElementArc(310, 310, (ts, e, r)=>e=='A' && r!=3, (ts, e, r)=>r+1);
afa.AddSingleElementArc(310, 320, (ts, e, r)=>e=='A' && r==3, (ts, e, r)=>r+1);
afa.AddSingleElementArc(320, 320, (ts, e, r)=>e=='B' && r>1, (ts, e, r)=>r−1);
afa.AddSingleElementArc(320, 330, (ts, e, r)=>e=='B' && r==1, (ts, e, r)=>r−1);
Notably, each method takes in the from-state, the to-state, and lambda expressions for the fence function and the transfer function. Additionally, each lambda expression takes as input the timestamp ("ts"), payload ("e"), and old value of the register ("r").

Notably, single element arcs do not transition when more than one element exists at the same timestamp. Accordingly, a list element arc represents the consumption of a list of events, all occurring at the same unique timestamp. As before, a list element arc utilizes a fence function that describes the condition under which the incoming event-list would result in a transition from one state to another (based on the new event timestamp, the list of event payloads for the timestamp, and the current value of the register), and a transfer function that describes the new value of the register at the to-state of the AFA arc. A list element arc may be added as follows: "afa.AddListElementArc(from, to, . . . )".

In order to use a list element arc, all the events at the same timestamp have to be copied and buffered before applying the fence and transfer lambdas. This can be quite expensive and wasteful of memory bandwidth and usage. Instead, each event arriving at the same current timestamp may be processed using a multi-element specification mechanism. A multi-element specification mechanism is similar to aggregate computations, wherein an accumulator may be used to incrementally compute the fence function and the transfer function as events at the same timestamp arrive at the processor (e.g., the data stream access engine). A multi-element arc may take five lambda expressions as input, including "initialize", "accumulate", "skiptoend", "fence", and "dispose".

The "initialize" input (or expression) may take the timestamp and old register value to compute the initial value of the accumulator. The "accumulate" input (or expression) may take the timestamp, an incoming event payload, the old register value, and the current accumulator value, and return the updated accumulator value. Notably, the "skiptoend" input (or expression) may be an optional input. The "skiptoend" input takes the timestamp, incoming payload, and accumulator value, and returns a Boolean value that indicates whether skipping to the end of the current timestamp directly may be performed. Accordingly, the "skiptoend" expression is an early exit optimization—it may be useful if it can be identified earlier that the fence and transfer results can be fully determined without having to examine the remaining events at that timestamp.

In an example, assume that 1,000 events have been identified as simultaneously arriving (i.e., each of the 1,000 events has an identical timestamp) at an AFA. Also assume that a given relevant fence function associated with the AFA comprises identifying three instances of 'A'. Further assume that after evaluating five of the 1,000 events, a match has already been identified (i.e., three instances of 'A'). As such, in some circumstances it may be beneficial to skip the 995 other events. Accordingly, using an accumulator and a skiptoend expression as described may allow for taking such actions.

With respect to the fence expression, once all the events at the current timestamp are processed (or the early exit condition from "skiptoend" is reached), the fence and transfer expressions may be executed. Upon execution, the transfer expression accepts the timestamp, the accumulator value, and the old register value as inputs, while outputting a Boolean value and the new register, respectively. At the end of the timestamp, the dispose expression (an optional expression) may be invoked to dispose of the accumulator instance.

In an example, assume an arc is to fire when any element at the current timestamp comprises an 'A'. A Boolean value may be used as an accumulator, and the lambda expressions for the multi-element arc may be as follows:
Initialize Expression: (ts, reg)=>false
Accumulate Expression: (ts, ev, reg, acc)=>ev=='A'
SkipToEnd Expression: (ts, ev, acc)=>acc
Fence Expression: (ts, acc, reg)=>acc
Transfer Expression: (ts, acc, reg)=> . . .
Dispose: null
A multi-element arc may then be added to an AFA instance as follows: afa.AddMultiElementArc(from, to, . . . ). The final arc type may be referred to as an epsilon element arc. The epsilon element arc is an arc that consumes no input: it fires immediately when the epsilon element's from-state is reached, and may be added to an AFA instance as follows: afa.AddEpsilonElementArc(from, to, . . . ).

Parameters of the AFA instance may be explicitly specified manually. For instance, a start state may be added via adding an arc, as described more fully herein. More specifically, by default, the from-state of the first added arc to the AFA, may automatically be considered as the start state. However, a user can override this default by setting a property called "StartState" in the AFA instance (e.g., afa.StartState=0). Furthermore, with respect to adding a final state, by default, the to-state of the last added arc to the AFA may be considered as the final state. Again, however, the user can override this default by setting final states for the AFA as follows: afa.AddFinalState(2). Notably, an AFA can have multiple final states, as further described herein. Users can also provide a lambda expression that defines the default initial value of a register when a new pattern match begins. If this is not provided, the register may be initialized using the default value associated with the type TRegister. For instance, for integers, the default may be zero.

Once the AFA instance has been defined, the AFA may be used to perform detection on a data stream "str" using a detect operator, as follows: "str.Detect( . . . )". Such a detect operation may accept several parameters. For example, the detect operation may accept the created AFA instance that is used for pattern detection over the stream as input. The detect operator may also accept an "allowoverlappinginstances" parameter. The allowoverlappinginstances parameter may determine whether a new event results in the creation of a new automaton instance starting at the start-state, when there is an ongoing active instance already in operation. In an example, assume an already existing AFA instance is detecting $A^iB^i$ and encounters a second A in the stream, the allowoverlappinginstances parameter may determine, in addition to incrementing the register for the already existing AFA instance by one (i.e., resulting in a register value of two this AFA instance), whether to create a new AFA instance with a register value of 1. When the allowoverlappinginstances is set to true, a new AFA instance would be created in this case, while when the allowoverlappinginstances is set to false, a new AFA instance would not be created in this case.

The detect operator may further accept an "isdeterministic" parameter. An AFA (or portions of an AFA) is deterministic when only one transition may occur with respect to a state of the AFA (i.e., each transition is mutually exclusive). For instance, a particular state in a deterministic AFA may include one arc that stays in the particular state and a second arc that transitions to another state, wherein the two arcs will never occur at the same time. As such, a non-deterministic AFA comprises an AFA that may potentially perform multiple state transitions at the same time (e.g., transitioning from a particular state to more than one state—a second state and a third state—at the same time).

Notably, at times, the AFA itself may not be provably deterministic at compile-time. However, a user (e.g., creator) of the AFA may be aware that based on the input stream contents, the AFA would behave deterministically (i.e., at most one outgoing arc at a given AFA state may fire successfully). Such knowledge (i.e., whether the AFA is deterministic or non-deterministic) is provided to the AFA using this parameter, and is used by the runtime for efficient operator specialization, as discussed in a later section. In an example, an AFA instance may include a first arc that transitions to a first state based on a volume being 30, while also having a second arc that transitions to a second state based on a cash value of 15. The AFA itself may not be able to determine that a volume of 30 and a cash value of 15 cannot happen at the same time, however, a user of the AFA may have knowledge of such. As such, the user may utilize the isdeterministic parameter to provide the AFA with such knowledge.

Returning to FIG. 2, as illustrated, the stream pattern detection system (e.g., an AFA instance) may also include an AFA application programming interface (API) 226. In particular, the API for specifying an AFA may utilize a syntax that is similar to that used for regular expressions. For instance, such a regular expression may comprise 'ab', which is an 'a' followed by a 'b' (i.e., where 'a' and 'b' comprise events in a data stream. Notably, in the example of FIG. 3, the AFA 300 was attempting to identify a pattern of events that comprised a sequence of 'A's followed by the same number of 'B's, which may be written as $A^iB^i$. A succinct way to specify a pattern may comprise using a regular expression syntax (i.e., "ab" as a regular expression for text matches the character 'a' followed by the character 'b'). In another example, "ab*" is a regular expression that matches the character 'a' followed by zero or more 'b' characters. While there is no one standard for specifying regular expressions, a juxtaposition may be used for concatenation and a may be used for repetition. Accordingly, the pattern "a*b*" may comprise a pattern of any number of occurrences of 'a' followed by any number of occurrences of 'b'.

The API for specifying an AFA may further comprise a set of methods that hide any explicit creation of a finite-state machine via adding arcs. In other words, instead of explicitly creating AFA's, the methods may allow for expressing simple patterns from which a state machine (e.g., an AFA) may be created. Notably, some of the examples herein use a set of static methods defined on the class REGEX, which may be useful when a user desires to define a particular pattern and assign it to a variable (or to pass it as an argument to another method). Various other examples described herein use a "fluent" form that allows for inlined chaining of pattern specifications and may be useful as an argument to the detect operation (or method) that is further described herein.

Initially, basic elements (further described herein as arc types) may be included within the API. For instance, a single element, a list element, a multi-element, and an epsilon element are now described with respect to the AFA API 226. For instance, to create a single element (i.e., to match a single element in a stream), the following may be used: Regex.SingleElement<char>(e='A') or str.Detect (x=>x.SingleElement(e='A')). On the other hand, a list element may be almost identical to single element described above, except that the list element takes a function whose argument is a list of events instead in place of a single event as shown with respect to the single element. Similarly, multi-event elements may be created as described with respect to the multi-element arc (i.e., by taking an initialize expression, an accumulate expression, a skiptoend expression (optional), a fence expression, and a dispose expression (optional)). Finally, the Epsilon element (or method) creates an empty element that matches a stream without consuming any elements. The epsilon method may be useful when defining disjunctions.

Additionally, various basic operations may also be included in the API. For instance, a concatenate operation (i.e., "Concat") may be included. The concatenate operation may comprise a pattern p followed by a pattern q, as follows: Regex.Concat(p, q) or str.Detect(x=>x.p.q). In another example, an 'or-concatenate' operation may be included. The or-concatenate operation (i.e., "OrConcat") may comprise an operation that is used to express that either a pattern p is matched or else the pattern pq (i.e., the concatenation of p and q) is matched. The or-concatenate operation may be useful in order to share the same state that is associated with matching p with that of matching q. The or-concatenate operation may be written as follow: Regex.OrConcat(p, q) or str.Detect(x=>x.p.OrConcat(q)). Another operation that may be used is referred to as "KleeneStar". The KleeneStar operation may be used to express that a pattern p is matched zero or more times (i.e., an expression of repeating patterns), which may be written as follows: Regex.KleeneStar(p) or str.Detect(x=>x.KleeneStar(q)). In another example, an operation referred to as "KleenePlus" may also be included within the API. The KleenePlus operation may be similar to the KleeneStar operation, except that the pattern is matched only when the pattern occurs at least once.

The API may also include a specification for handling registers. More specifically, registers may be specified by adding an extra lambda expression to each method call. For instance, to match $A^iB^i$, the lambda (e,r)=>0 initializes the register to zero and the lambda (e,r)=>r+1 increments the register. Similarly, time constraints may be specified by using lambda expressions that take a time parameter that allows the expression to access the timestamp of the matched event. The timestamp of the matched event can be used either as part of the predicate that defines a matching pattern, or in the register lambda expression to relate the time at which two different patterns are matched. Using the "fluent" regular-expression API, as briefly described

```
str
  .Detect(0, p => p
  .KleenePlus(x => x.SingleElement(e => e == 'A', (ev, r) => r + 1))
  .KleeneStar(x => x.SingleElement((ts, e, r) => e == 'B' && 1 < r,
    (ev, r) => r - 1))
  .SingleElement((ts, e, r) => e == 'B' && r == 1),
  AllowOverlappingInstances: false
);
``` herein, an example follows:

As shown in the example, the method "Detect" takes as a first argument the initial value for the register. Because the register comprises an integer type, zero is used as the initial value. The next argument of the method "Detect" comprises a lambda expression that maps a pattern to a new pattern (i.e., the pattern to be matched/identified). As shown, the pattern to be matched comprises the concatenation of three sub-patterns. The first sub-pattern specifies one or more single elements, comprising an 'A'. When an 'A' is found, the register is then incremented. The second sub-pattern comprises zero or more single elements with each element being a 'B', and with the contents of the register being greater than one. Upon each match of 'B', the register is decremented. Finally, a single 'B' completes the overall pattern as long as the register is exactly one. The third sub-pattern is then used to anchor the pattern to the last 'B' found.

In some embodiments, after identifying the final 'B', the register may not be decremented to zero. In other embodiments, the register may be decremented to zero after identifying the final 'B' when the final value of the register is to be used. The second two sub-patterns use a single element method (i.e., "SingleElement") that takes a function of three arguments. Doing so provides access to the timestamp of the event (i.e., parameter ts), the event payload (parameter e), and the register (parameter r). Notably, the optional argument, "AllowOverlappingInstances" (as further described herein) is used to prevent overlapping matches. Using the "AllowOverlappingInstances" guarantees that the input sequence "AAABBB" matches only once rather than producing three matches (i.e., one for "AB", one for "AABB", and one for the entire sequence).

As illustrated in FIG. 2, the environment 200 includes an automaton-specific code generator 230 that is configured to analyze a given AFA specification and dynamically generate code specific to the given AFA to thereby efficiently identify patterns within a given data stream. More specifically, given an AFA specification (potentially using the API discussed herein), the AFA may be compiled such that it can be executed using AFA runtime operators (i.e., automaton-specific code generated by the automaton-specific code generator 230). As illustrated, the automaton-specific code generator includes an automaton analytics engine 232 that is configured to analyze a given AFA specification to identify whether a stream to be analyzed by the AFA is grouped or not, whether the given AFA is deterministic, and the types of arcs of the given AFA.

Accordingly, the automaton analytics engine 232 may focus particularly on the analysis of three particular factors, grouping (i.e., grouped or ungrouped), determinism (i.e., deterministic or non-deterministic), and arc type (e.g., single element, list element, multi-element, and so forth). The first factor, grouping, indicates whether the type TInput is "grouped", which specifies whether a particular operator maintains a separate state for each group as defined by its grouping key (i.e., a grouping setting of an AFA specification may be on or off), as further described herein. With respect to the second factor, a non-deterministic AFA (i.e., the second factor) keeps track of multiple active states, which is overhead that can be optimized away with a specialized operator for deterministic or non-deterministic AFA's. Finally, with respect to the third factor (i.e., arc types of the given AFA specification), an operator (i.e., generated code) can be much more efficient when all of the arc types of the given AFA are known. For instance, when each arc of a given AFA comprises a single-element arc, the generated code, or operators, (i.e., generated AFA-specific code) may be specialized for that particular case (i.e., the generated code may not include anything related to identifying list element arcs, multi-element arcs, and so forth).

In addition to those three factors (i.e., grouping, determinism, and arc type), the entirety of the AFA (i.e., at each state, the operator has to iterate over the list of active outgoing arcs and call the corresponding fence function to see which arcs should be traversed) may be analyzed by the automaton analytics engine to ultimately generate code that is as specific as possible for a given AFA. Accordingly, additional AFA-specific code may be dynamically generated by the automaton-specific code generator 230 to make runtime of a given AFA even more efficient. For instance, such a custom runtime operator may have one or more of the following features: 1. The AFA may be explicitly encoded instead of interpreting the transitions; 2. All functions (i.e., both fence and transfer functions) are inlined instead of using dynamic dispatch to delegate; and 3. The generated code may be type-specialized (i.e., a columnar representation may be used, as further described herein). Notably, while the automaton-specific code generator is illustrated as being separate from the stream pattern detection computer system, the automaton-specific code generator may also comprise part of the stream pattern detection computer system 220.

As briefly described with respect to the "grouping" factor, the generated code may also inherit the ability to perform grouped computations by accepting and producing batches of events (i.e., when a given AFA specification includes such grouping). More specifically, as each event is accessed by the AFA, rather than processing each event as the event is accessed, the dynamically generated code may be configured to batch the events into groups. In some embodiments, each batch will be stored in a columnar format. Each batch may further include a special field (i.e., associated with a row or, if columnar, as a separate column in the batch) that is interpreted as a grouping key. For instance, assume that events associated with parts (e.g., car parts, tools, and so forth) are being accessed in a data stream. Further assume that each part has an associated part number, price, and purchase date. In such an example, accessed events of parts may be batched into groups rather than immediately processing each event. As part of batching the events, the events may be stored/organized in a columnar format, such that part numbers are in a first column, prices in a second column, and purchase dates in a third column. Each such column may also include a special field that is interpreted as a grouping key.

Additionally, each set of active AFA states may then be stored in a hash table that is indexed by the grouping key. When an event is processed, we look up its current states from the hash table are accessed, followed by applying transitions on the relevant states. Accordingly, as part of the dynamic code generation, a generated operator may know of each active group in the system, such that the generated operator can go to the appropriate group and retrieve the state (i.e., in order to apply the appropriate AFA computation on the retrieved state) when new event is accessed (e.g., received or retrieved). In some embodiments, the generated code may be specialized for the ungrouped case, in order to avoid incurring the cost of a hash table lookup. Additionally, when an active match for a key is terminated, the active match may be removed from the hash table to control overall memory usage. The generated code may also be scaled out on multiple cores by using scale-out constructs, which may include, but not be limited to, group-and-apply, sharding, and map-reduce. Using scale-out constructs may allow for scaling per-group pattern detection across all the cores of a machine.

Figure 4:
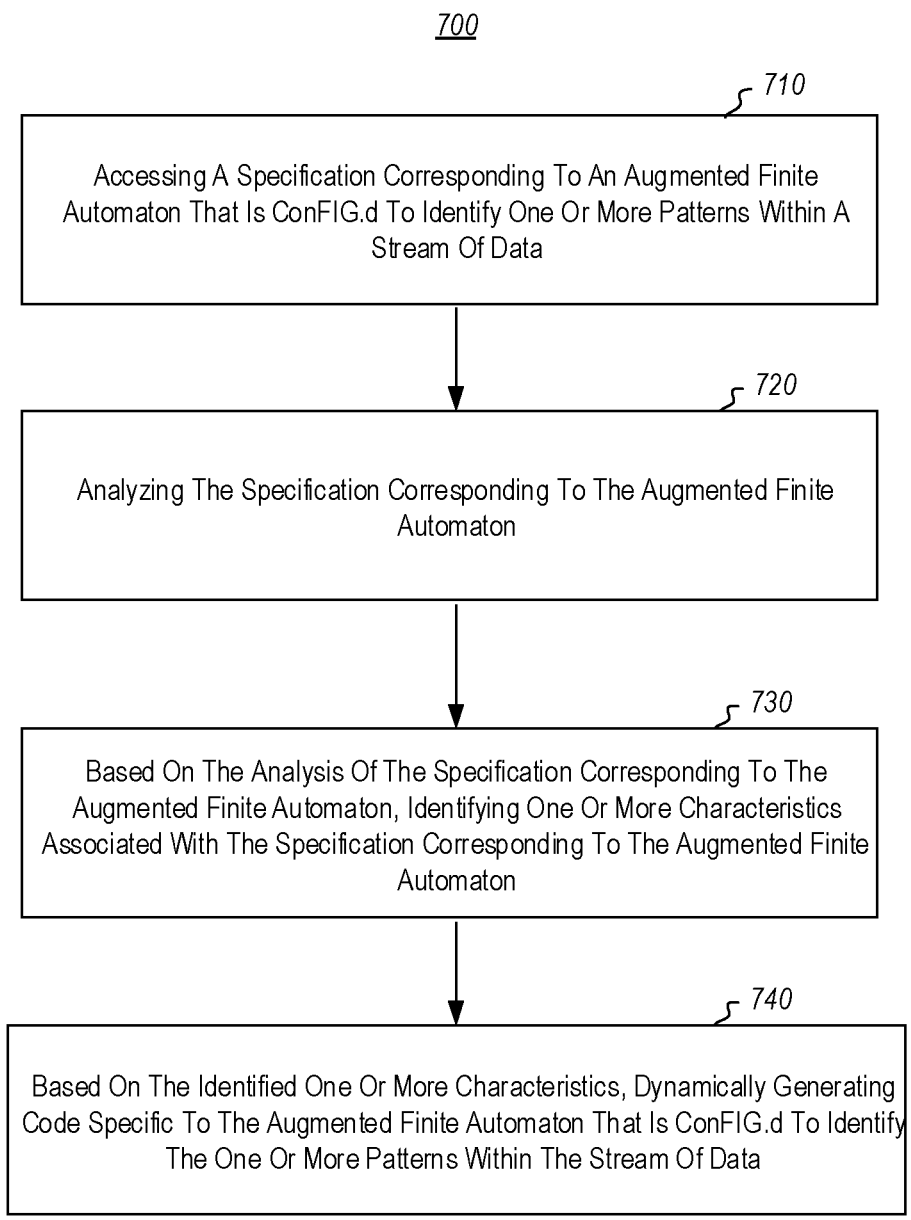
FIG. 4 illustrates a flowchart of a method for generating code that is specific to a particular augmented finite automaton for efficient identification of patterns within a stream of data

FIG. 4 illustrates a flowchart of a method 400 for generating code that is specific to a particular augmented finite automaton for efficient identification of patterns within a stream of data. The method 400 is described with frequent reference to the environment 200 of FIG. 2. The method 400 includes accessing a specification corresponding to an augmented finite automaton that is configured to identify one or more patterns within a stream of data (Act 410). For instance, the automaton-specific code generator 230 may access a specification (e.g., written in a software programming language as further described herein) associated with a particular AFA. The method 400 may further include analyzing the specification corresponding to the augmented finite automaton (Act 420). For example, automaton analytics engine 232 may analyze the specification of the AFA to understand properties or characteristics associated with the AFA.

The method 400 may further include, based on the analysis of the specification corresponding to the augmented finite automaton, identifying one or more characteristics associated with the specification corresponding to the augmented finite automaton (Act 430). For example, the automaton analytics engine may determine one or more characteristics associated with the specification corresponding to the AFA. More specifically, the automaton analytics engine may determine properties of the specification associated with grouping (i.e., grouping on or grouping off), determinism (i.e., deterministic or non-deterministic), and arc types (i.e., single element arc types, list element arc types, multi-element arc types, and so forth). Additionally, such analysis may also consider the streams that are to be analyzed by the AFA. For instance, based on the type of events within a stream may aid in determining whether a particular arc of the AFA is deterministic or non-deterministic, as further described herein.

The method 400 may further include, based on the identified one or more characteristics, dynamically generating code specific to the augmented finite automaton that is configured to identify the one or more patterns within the stream of data (Act 440). For instance, based on the analysis of the automaton analytics engine, the automaton-specific code generator may dynamically generate code that is specific to the specification corresponding to the AFA. As such, the dynamically generated code may be custom generated to efficiently identify patterns within streams of data based on characteristics of the analysis of the AFA specification.

In this way, a specification associated with an augmented finite automaton for pattern detection over streams of data may be created utilizing an appropriate software programming language (e.g., high-level programming languages). Such specifications may include pattern detection that leverages latency-aware batching, grouped execution, columnar data organization, and customized dynamic code generation based on both stream and automata properties. Such dynamic code generation may allow for creating code that is specifically tailored to a particular augmented finite automaton and the type of stream that will be analyzed by the automaton. Additionally, a language-integrated application programming interface (API) to be used in conjunction with the specification may also be generated. Using such specifications, API's, and dynamically generated code may allow for matching patterns within streams of data at orders-of-magnitude higher throughputs than previously possible.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
   one or more processors; and
   one or more computer-readable storage media having stored thereon computer-executable instructions that are executable by the one or more processors to cause the computer system to generate code that is specific to a particular augmented finite automaton for efficient identification of patterns within a stream of data, the identification of patterns being based on processing one or more events in the stream of data, the computer-executable instructions including instructions that are executable to configure the computer system to perform at least the following:
   access a specification corresponding to an augmented finite automaton that is configured to identify one or more patterns within a stream of data, the augmented finite automaton comprising a directed graph with nodes representing states of pattern detection, with edges between the nodes comprising arcs that define transitions between the different states, each arc including a fence function and a transfer function, the fence function defining when each corresponding arc is triggered and the transfer function including a counter element for tracking a count within a register associated with the corresponding arc, wherein the fence function and the transfer function are operable to define conditions for the augmented finite automaton to transition from one state to another state while identifying events and/or patterns within the stream of data;

analyze the specification corresponding to the augmented finite automaton;

based on the analysis of the specification corresponding to the augmented finite automaton, identify one or more characteristics associated with the specification corresponding to the augmented finite automaton, the one or more characteristics including at least the transfer function and the fence function for a corresponding arc;

based on the identified one or more characteristics, dynamically generate code specific to the augmented finite automaton that is configured to identify the one or more patterns within the stream of data by at least transitioning between different states in response to a triggering of the corresponding arc caused by the fence function and the transfer function being satisfied; and configure the code to identify events in the stream of data and to process the events to identify patterns in the stream of data by at least configuring the code to cause transitioning between the different states of pattern detection according to the augmented finite automaton specification in response to event data in the stream of data satisfying the fence function and the transfer function for triggering the corresponding arc associated with the transitioning.

2. The computer system in accordance with claim 1, wherein the accessed specification corresponding to the augmented finite automaton comprises an augmented finite automaton that has been generated using a software programming language.

3. The computer system in accordance with claim 2, wherein the software programming language comprises one or more of C#, C++, and Java.

4. The computer system in accordance with claim 1, wherein the one or more characteristics associated with the specification corresponding to the augmented finite automaton further comprises at least a grouping factor and at least a determinism factor.

5. The computer system in accordance with claim 1, wherein the computer-executable instructions further include instructions that are executable to cause the computer system to, in response to receiving the stream of data, utilize the dynamically generated code to identify the one or more patterns within the stream of data.

6. The computer system in accordance with claim 1, wherein the register is configured to aid in identifying complex patterns within the stream of data.

7. The computer system in accordance with claim 1, wherein based on the one or more characteristics associated with the specification corresponding to the augmented finite automaton, the dynamically generated code is further configured to identify overlapping instances of pattern matches.

8. A method, implemented at a computer system that includes one or more processors, for generating code that is specific to a particular augmented finite automaton for efficient identification of patterns within a stream of data, the identification of patterns being based on processing one or more events in the stream of data, comprising:

accessing a specification corresponding to an augmented finite automaton that is configured to identify one or more patterns within a stream of data, the augmented finite automaton comprising a directed graph with nodes representing states of pattern detection, with edges between the nodes comprising arcs that define transitions between the different states, each arc including a fence function and a transfer function, the fence function defining when each corresponding arc is triggered and the transfer function including a counter element for tracking a count within a register associated with the corresponding arc, wherein the fence function and the transfer function are operable to define conditions for the augmented finite automaton to transition from one state to another state while identifying events and/or patterns within the stream of data;

analyzing the specification corresponding to the augmented finite automaton;

based on the analysis of the specification corresponding to the augmented finite automaton, identifying one or more characteristics associated with the specification corresponding to the augmented finite automaton, the one or more characteristics including at least the transfer function and the fence function for a corresponding arc;

based on the identified one or more characteristics, dynamically generating code specific to the augmented finite automaton that is configured to identify the one or more patterns within the stream of data by at least transitioning between different states in response to a triggering of the corresponding arc caused by the fence function and the transfer function being satisfied; and configuring the code to identify events in the stream of data and to process the events to identify patterns in the stream of data by at least configuring the code to cause transitioning between the different states of pattern detection according to the augmented finite automaton specification in response to event data in the stream of data satisfying the fence function and the transfer function for triggering the corresponding arc associated with the transitioning.

9. The method in accordance with claim 8, wherein the accessed specification corresponding to the augmented finite automaton comprises an augmented finite automaton that has been generated using a software programming language.

10. The method in accordance with claim 9, wherein the software programming language comprises one or more of C#, C++, and Java.

11. The method in accordance with claim 8, wherein the one or more characteristics associated with the specification corresponding to the augmented finite automaton further comprises at least a grouping factor and at least a determinism factor.

12. The method in accordance with claim 8, further comprising, in response to receiving the stream of data, utilizing the dynamically generated code to identify the one or more patterns within the stream of data.

13. The method in accordance with claim 8, wherein the register is configured to aid in identifying complex patterns within the stream of data.

14. The method in accordance with claim 8, wherein the specification corresponding to the augmented finite automaton is configured to generate a new augmented finite automaton instance that can overlap a current augmented finite automaton instance upon identifying a new event in the stream of data that matches at least a portion of the one or more patterns.

15. The method in accordance with claim 8, wherein the specification corresponding to the augmented finite automaton includes at least one arc that is configured to perform a transition to a new state even when more than one event within the stream of data includes the same time stamp.

16. A computer program product comprising one or more hardware storage devices having stored thereon computer-executable instructions that are executable by one or more processors of a computer system to generate code that is specific to a particular augmented finite automaton for efficient identification of patterns within a stream of data, the identification of patterns being based on processing one or more events in the stream of data, the computer-executable instructions including instructions that are executable to configure the computer system to perform at least the following:

accessing a specification corresponding to an augmented finite automaton that is configured to identify one or more patterns within a stream of data, the augmented finite automaton comprising a directed graph with nodes representing states of pattern detection, with edges between the nodes comprising arcs that define transitions between the different states, each arc including a fence function and a transfer function, the fence function defining when each corresponding arc is triggered and the transfer function including a counter element for tracking a count within a register associated with the corresponding arc, wherein the fence function and the transfer function are operable to define conditions for the augmented finite automaton to transition from one state to another state while identifying events and/or patterns within the stream of data;

analyzing the specification corresponding to the augmented finite automaton;

based on the analysis of the specification corresponding to the augmented finite automaton, identifying one or more characteristics associated with the specification corresponding to the augmented finite automaton, the one or more characteristics including at least the transfer function and the fence function for a corresponding arc;

based on the identified one or more characteristics, dynamically generating code specific to the augmented finite automaton that is configured to identify the one or more patterns within the stream of data by at least transitioning between different states in response to a triggering of the corresponding arc caused by the fence function and the transfer function being satisfied; and configuring the code to identify events in the stream of data and to process the events to identify patterns in the stream of data by at least configuring the code to cause transitioning between the different states of pattern detection according to the augmented finite automaton specification in response to event data in the stream of data satisfying the fence function and the transfer function for triggering the corresponding arc associated with the transitioning.

17. The computer program product in accordance with claim 16, wherein the accessed specification corresponding to the augmented finite automaton comprises an augmented finite automaton that has been generated using a software programming language.

18. The computer program product in accordance with claim 17, wherein the software programming language comprises one or more of C#, C++, and Java.

19. The computer program product in accordance with claim 16, wherein the one or more characteristics associated with the specification corresponding to the augmented finite automaton further comprises at least a grouping factor and at least a determinism factor.

20. The computer program product in accordance with claim 16, wherein the computer-executable instructions further include instructions that are executable to cause the computer system to, in response to receiving the stream of data, utilize the dynamically generated code to identify the one or more patterns within the stream of data.

\* \* \* \* \*